United States Patent [19]

Olson

[11] Patent Number: 4,939,625
[45] Date of Patent: Jul. 3, 1990

[54] METHOD AND SYSTEM FOR DISPLAYING OBJECTS

[76] Inventor: Douglas M. Olson, 1980 Galena St., Aurora, Colo. 80010

[21] Appl. No.: 332,566

[22] Filed: Mar. 31, 1989

Related U.S. Application Data

[63] Continuation-in-part of Ser. No. 184,933, Apr. 22, 1988, abandoned.

[51] Int. Cl.⁵ ............................................. F21V 33/00
[52] U.S. Cl. .................................... 362/154; 362/253; 312/223; 206/387
[58] Field of Search ..................... 362/30, 31, 32, 86, 362/125, 133, 154, 253, 300, 806; 312/223; 222/155; 206/311, 312, 387

[56] References Cited

U.S. PATENT DOCUMENTS 3,644,009  2/1972  Tyler ............................. 312/223 X
3,838,266  9/1974  Jonathan ....................... 312/223 X
4,231,625  11/1980  Perez et al. ................... 312/223 X Primary Examiner—Stephen F. Husar
Attorney, Agent, or Firm—Brian D. Smith

[57] ABSTRACT

A method and system for displaying objects are disclosed. The display system includes a cabinet having at least one viewing compartment such as a shelf and a light source mounted in the back of the cabinet. The system also includes a plurality of generally rectangularly shaped cases such as a compact disc case each of which has at least one generally transparent side and one generally transparent end edge adjoining the transparent side. Each case also has a generally opaque label affixed to the inside surface of the transparent end edge. The cases are arranged in the viewing compartment in an abutting side by side manner and positioned in the viewing compartment with respect to the light source so that the transparent sides of the abutting cases are capable of receiving and transmitting light from the light source to the transparent end edges of the cases where the light illuminates the labels affixed to the inside surfaces of the transparent end edges.

20 Claims, 2 Drawing Sheets

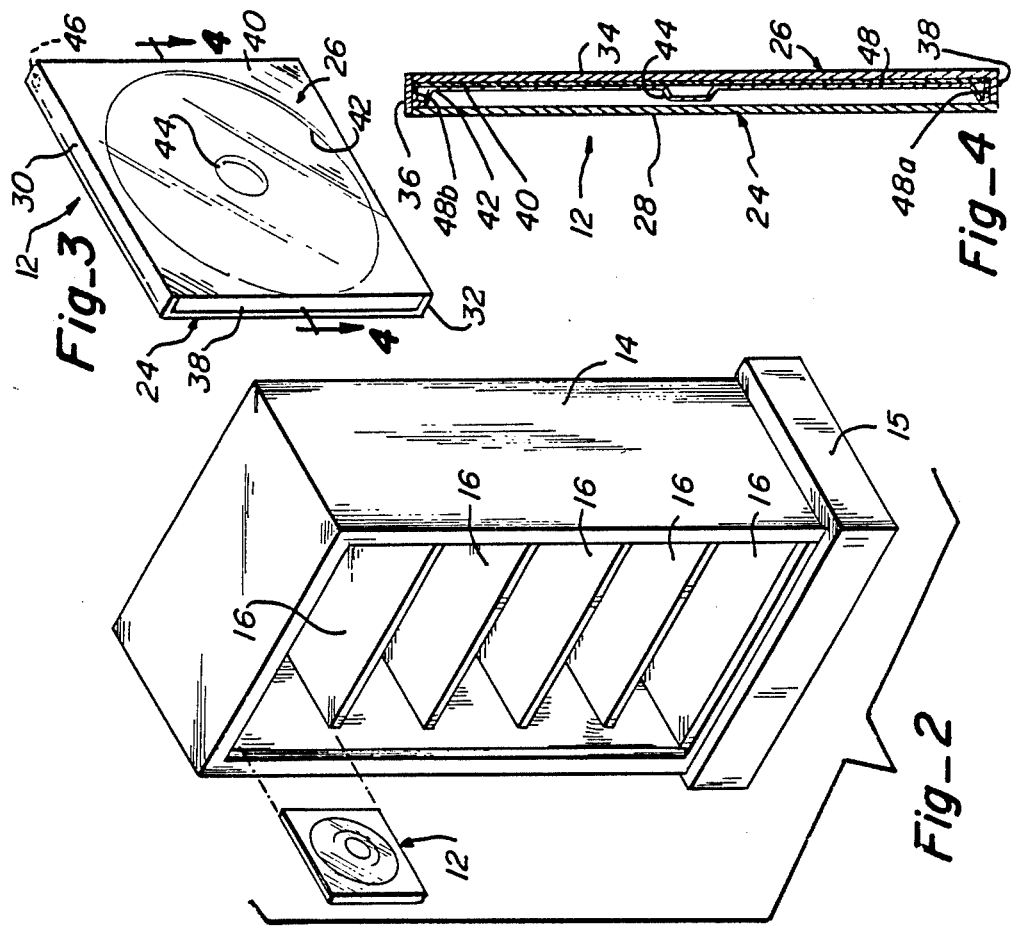

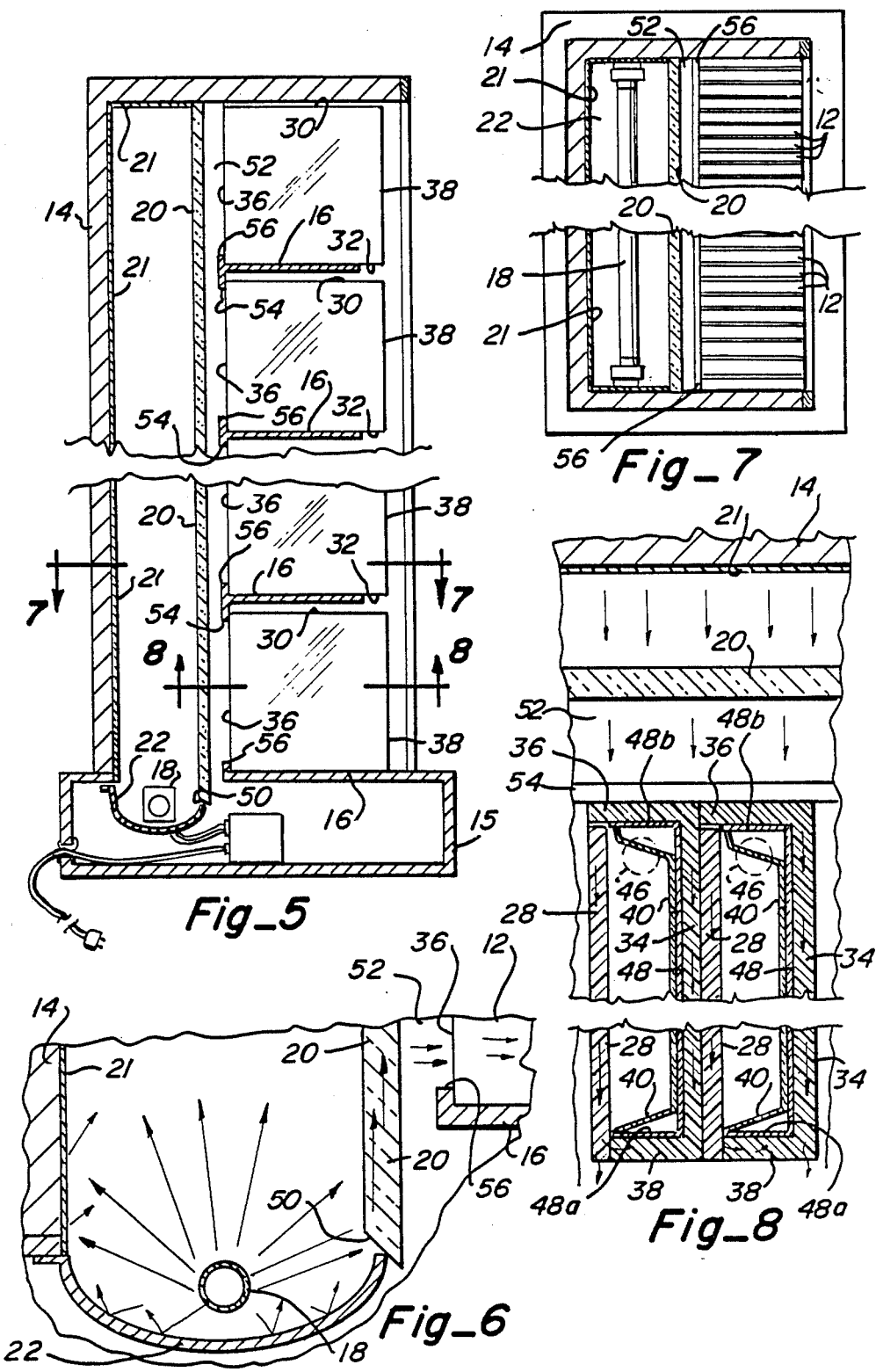

METHOD AND SYSTEM FOR DISPLAYING OBJECTS

This application is a continuation-in-part of application Ser. No. 184,933, filed April 22, 1988, now abandoned.

TECHNICAL FIELD OF THE INVENTION

The invention relates generally to methods and systems for storing and displaying objects and, more specifically, to a method and system for storing and displaying transparent plastic cases having opaque contents such as compact disc cases and audio and/or video cassette cases.

1. Background Art

Many systems have been designed and developed over the years for the storage and display of items such as vinyl albums, eight-track cassettes and video and audio cassettes. The recent advent of the compact disc has resulted in a new wave of systems designed specifically for storing and displaying compact discs. While many of these designs are extremely functional, none utilizes the concept of backlighting or transillumination to illuminate the cases in which the cassettes or discs are stored.

2. Disclosure of the Invention

The present invention addresses the aforementioned needs by providing a system for storing, displaying and illuminating a plurality of objects having generally transparent outer coverings or cases. Such objects would typically include audio and video cassette cases and compact disc cases. The system creates a unique visual effect which almost gives the plurality of cases the appearance of glowing when the objects are illuminated.

The system includes a cabinet having at least one viewing platform or shelf and a light source mounted in the back of the cabinet. In addition, the system includes a plurality of opaque objects having a generally transparent outer covering or case. The transparent outer coverings or cases of the opaque objects are sized and configured to make substantial surface contact with each other when the objects are arranged on the viewing platform or shelf in an abutting side by side manner. The abutting objects are also positioned on the viewing platform or shelf so that those portions of the outer coverings making surface contact with each other are capable of receiving and transmitting light from the light source to illuminate the objects, i.e., the objects contained within the transparent outer covering or case.

In a preferred embodiment of the invention, the transparent outer coverings or cases are generally rectangularly shaped and provided with at least one generally transparent side and one generally transparent end edge which adjoins the transparent side. The case also has a generally opaque label affixed the inside surface of at least the transparent end edge. A plurality of the cases are arranged in the viewing compartment or on the shelf in an abutting side by side manner. The abutting cases are also positioned in the viewing compartment or on the shelf with respect to the light source so that the transparent sides of the cases are capable of receiving and transmitting light from the light source to the transparent end edges of the cases where the light illuminates the labels affixed to the inside surfaces of the end edges.

The present invention also provides a method of displaying objects. The method includes providing a cabinet having at least one viewing compartment and a light source mounted in the back of the cabinet. The method further includes providing a plurality of opaque objects each of which has a generally transparent outer covering or case. The outer coverings or cases are sized and configured to make substantial surface contact with each other when they are arranged in the viewing compartment in an abutting side by side manner. The method further includes arranging the plurality of opaque objects in the aforementioned abutting side by side manner so that substantial portions of the coverings are in surface contact with each other. The method further includes positioning the plurality of abutting opaque objects in the viewing compartment so that the outer coverings of the objects are capable of receiving and transmitting light from the light source to illuminate the objects. The method further includes turning the light source on to illuminate the objects.

BRIEF DESCRIPTION OF THE DRAWINGS

Other features of the present invention will appear in the following description and appended claims, reference being made to the accompanying drawings forming a part of the specification where like referenced characters designate corresponding parts in the various views.

FIG. 1 is a perspective view of the display system of the present invention.

FIG. 2 is a perspective view of the cabinet illustrated in FIG. 1 which additionally illustrates a single compact disc case and by dotted line indicates the disc's location on a shelf of the cabinet.

FIG. 3 is a perspective view of the compact disc case of FIG. 2.

FIG. 4 is a cross-sectional view taken along lines 4—4 of FIG. 3.

FIG. 5 is a cross-sectional view taken along lines 5—5 of FIG. 1.

FIG. 6 is an enlarged partial cross-sectional view of FIG. 5 illustrating the light source, reflective surfaces and bottom shelf of FIG. 5.

FIG. 7 is a cross-sectional view taken along lines 7—7 of FIG. 5.

FIG. 8 is a cross-sectional view taken along lines 8—8 of FIG. 5.

BEST MODE FOR CARRYING OUT THE INVENTION

FIGS. 1 through 8 illustrate a system 10 of the present invention for storing, displaying and illuminating compact disc cases 12. The system includes a storage cabinet 14 having a base 15 and five horizontal but vertically spaced shelves 16 upon which the compact discs are stored and displayed. The system also includes a light source 18 mounted in the back of the cabinet and a translucent panel 20 mounted between the shelves and light source 18. Translucent panel 20 serves to diffuse and uniformly distribute light from light source 18 onto the compact disc cases stored on the shelves.

System 10 also includes, as best illustrated in FIGS. 5, 6 and 7, reflective or mirrored surfaces 21 and 22. These surfaces serve to reflect light radiating from light source 18 onto translucent panel 20, thereby enhancing the distribution or transmission of light onto the compact discs stored on shelves 16. As best illustrated in FIG. 5, reflective surface 21 covers virtually the entire inside surface of that portion of cabinet 14 located behind translucent panel 20. Reflective surface 22 is located beneath light source 18 in the base of cabinet 14 and is sized to co-extend with light source 18 across the width of the cabinet (see FIG. 7).

Light source 18 is preferably florescent because of florescent lighting's low wattage requirements and low heat output. However, it could be an incandescent source, a light emitting diode source, a source utilizing fiber optics or a luminescent panel.

An important aspect of the present invention is directed to the compact disc cases themselves and to the discovery that a unique and aesthetic visual backlighting or transillumination effect is achieved by arranging the compact discs on shelves 16 in an abutting side by side manner or as also referred to herein "in a row". This visual effect cannot be reproduced in the drawings. It can, however, be visualized if one first gains an understanding of the construction of a typical compact disc case.

FIGS. 3 and 4 illustrate a typical compact disc case 12. The case has a generally transparent left half 24 and a generally transparent right half 26. Left half 24 is a molded one piece, transparent plastic unit which defines the case's left side 28, top edge 30 and bottom edge 32, all of which transparent. Right half 26 is also a molded one piece, transparent unit which defines the case's right side 34, back edge 36 and front edge 38, all of which are also generally transparent. Right half 26 also includes snap means (not shown) for securing a generally opaque, rectangular platform 40 to the right side of the case. The platform has a circular depression 42 for holding a compact disc (not shown) and pressure fitting retaining means 44 for securing and retaining the compact disc in the circular depression. Right and left halves 24, 26 are also pivotally connected to each other for pivotal movement about back edge 36 by a pivoting means. This pivoting means typically includes a pair of opposing but aligned pins 46 which project inwardly from top edge 30 and bottom edge 32 of the left half 24 of case 12. Pins 46 snap into bores (not shown) provided for such in right half 26 of the case along the case's back edge 36. A typical compact disc case 12 sold with a recorded disc also usually has an opaque paper liner or label which identifies the artist and the music recorded by the artist on the disc. The liner or label is usually provided in two sections. One section (not shown) is typically affixed to the inside surface of left side 28. The other section identified by numeral 48 in FIG. 8 is typically affixed to the inside surface of right side 34, front edge 38 and back edge 36 of the right half 26 of the case. Those portions of label 48 which are affixed to the inside surfaces of front edge 38 and back edge 36 are referred to herein as the edge labels and are identified respectively by numerals 48(a) and 48(b). Platform 40 which, as previously mentioned, snaps into right half 26 is utilized to affix or hold label 48 including edge labels 48(a) and (b) in place.

The arrows depicted in FIGS. 6 and 8 represent light radiating from light source 18. In FIG. 6, it can be seen that some light radiating from light source 18 is projected directly onto translucent panel 20. It can also be seen that some light form source 18 reflects off reflective surfaces 21 and 22 whereupon it is then projected onto translucent panel 20. Some light also enters translucent panel 20 through a beveled bottom edge 50 of panel 20 which is beveled at an angle (approximately 45°) to optimize the collection of light from light source 18.

FIG. 8 illustrates the path taken by most of the light radiating from light source 18 after it exits translucent panel 20. As illustrated, the light first travels across an air space 52 located between translucent panel 20 and the back edges 36 of the compact disc cases arranged on shelves 16. Since back edges 36 are transparent, light contacting edges 36 enters the edges. Similarly, since sides 28 and 34 are transparent, light having entered edges 38 is conducted through sides 28 and 34. The conducted light then enters transparent front edges 38 where it illuminates edge labels 48(a) which, as previously mentioned, are affixed to the inside surfaces of front edges 38. Since front edges 38 are arranged on the shelves to face the front of cabinet 14, as illustrated in FIG. 1, an individual trying to locate a particular disc should be able to easily locate the disc since, once illuminated, edge labels 48(a) will be easy to read. It should be noted that while the compact disc cases are arranged on shelves 16 with front edges 38 facing the front of the cabinet, the same backlighting effect would be produced if back edges 36 were facing the front.

A single free standing compact disc case will conduct light as set forth above. However, it has been found that a plurality of compact disc cases will greatly enhance the conduction of light to front edges 38 and thereby create the aforementioned unique visual effect (i.e., the front facing edges) if the plurality of the compact disc cases are arranged, as illustrated in FIGS. 1, 7 and 8, in an abutting side by side manner, i.e., where the side 34 of one compact disc is in contact, i.e., making surface contact, with the side 28 of an adjacent compact disc case. Why such edge illumination occurs, i.e., illumination of the front facing edges 38, is not completely understood. However, it has been found that edge illumination is much greater when the compact disc cases are arranged in the aforementioned side by side abutting manner than it is when they are spaced from each other; for example, where they might be spaced or separated from another by dividers. As previously mentioned, the reason for such enhancement is not fully understood. It is believed, however, that the provision of a space or gap between adjacent discs may possibly diffract or absorb light being transmitted through the sides of the cases. This would, quite obviously, reduce the amount of light reaching front edges 38, thereby weakening or diminishing the edge illumination effect. Whatever the reason, edge illumination is greatly enhanced when the compact disc cases are arranged in the aforementioned side by side manner. The plurality of illuminated cases almost appears to glow and the effect is particularly pronounced when an entire shelf is filled with the cases.

Edge illumination is also enhanced in accordance with the present invention by providing the back edge of each upper shelf 16 with a member (not numbered) that includes an opaque downwardly extending portion 54. Downwardly extending portions 54 apparently enhance edge illumination by blocking or at least reducing the transmission of light from source 18 through the gap existing between the bottom of the shelf and the top edges 30 of the row of compact disc cases 12 lying on the shelf located immediately below the shelf provided with portion 54. If downwardly extending portions 54 were not provided, the brightly lighted translucent panel 20 would be visible to one viewing the compact discs. If bright enough, the light from translucent panel 20 could possibly "over power" the edge illumination. Thus, the focus of an observer's eyes would not be on the illuminated edge labels 48(a) but rather be on those exposed, visible portions of translucent panel 20. Thus, while the edge labels 48(a) would be still be illuminated and still could be read, they would not appear to be as bright as they are when the downwardly extending portions 54 are provided to hide translucent panel 20.

The members having the downwardly extending portions 54 also include, as illustrated in FIG. 5, an upwardly extending portion or backstop 56 extending above the surface of each shelf 16. (Note that the bottom shelf 16 of system 10 also has an upwardly extending portion or backstop 56 even though it does not have a downwardly extending portion 54). Backstop 56 provides an abutment which prevents the compact disc case from being pushed off the back edge of shelf 16. Backstop 56 may also be transparent if desired. In fact, shelves 16 may also be transparent and the provision of transparent shelves and backstops may actually enhance edge illumination in some situations.

FIG. 8 also illustrates that the shelves have a depth which is less than the length or depth of a compact disc case. As such, the cases project slightly beyond the front edge (not numbered) of the shelf upon which they are stored. This makes it possible for an individual to locate his or her fingers on the bottom edge 32 of a compact disc case. Accordingly, it will be much easier for an individual to grasp the case for purposes of removing it from the shelf.

Ease of disc removal from the shelves is also enhanced by predetermining the vertical spacing between the shelves to be slightly greater than the height of the compact disc cases which are stored on the shelves. Preferably, the vertical spacing is greater than the height of the compact disc case by a distance which approximates the width of an individual's finger. As such, ample clearance for the insertion of a finger is provided between top edges 30 of the compact disc cases and the underside surface of the shelf located immediately above the cases. This makes it easy for an individual to locate a finger on the top edge 30 of a desired case for purposes of grasping and thereby removing the desired disc from the shelf.

While the invention has been described in detail with reference to a particular embodiment thereof directed to compact disc cases, it will and should be understood that this invention is not to be limited to the particular embodiment disclosed and changes in detail and construction of the invention may be made without departing from the spirit thereof.

What is claimed is:

1. A display system comprising:
    a cabinet having at least one viewing platform;
    a light source mounted in the back of said cabinet; and
    a plurality of opaque objects each of which has a generally transparent outer covering, said transparent outer coverings being sized and configured to make substantial surface contact with each other when said objects are arranged on said viewing platform in an abutting side by side manner, said arranged objects further being positioned on said viewing platform so that those portions of said outer coverings making surface contact with each other are capable of receiving and transmitting light from said light source to illuminate said objects.

2. A display system as claimed in claim 1 further comprising a translucent panel mounted in said cabinet between said viewing platform and said light source and being positioned within said cabinet so as to uniformly distribute light from said light source onto said viewing platform.

3. A display system as claimed in claim 1 wherein said opaque objects having transparent outer coverings are compact disc cases.

4. A display system as claimed in claim 1 wherein said opaque objects having transparent outer coverings are audio cassette cases.

5. A display system as claimed in claim 1 wherein said opaque objects having transparent outer coverings are video cassette cases.

6. A display system as claimed in claim 1 wherein said transparent outer coverings are plastic cases for holding a member selected from the group consisting of video cassettes, compact discs, and audio cassettes and wherein said opaque object is a label affixed to the interior surface of said plastic case.

7. A display system as claimed in claim 1 wherein said light source is of a type selected from the group consisting of incandescent lighting, florescent lighting and light sources having low heat output.

8. A display system comprising:
    a cabinet having at least one viewing compartment;
    a light source mounted in the back of said cabinet; and
    a plurality of generally rectangularly shaped cases each of which has at least one generally transparent side and one generally transparent end edge, said end edge adjoining said transparent side, each case also having a generally opaque label affixed to the inside surface of said transparent end edge, said cases being arranged in said viewing compartment in an abutting side by side manner and positioned in said viewing compartment with respect to said light source so that said transparent sides of said cases are capable of receiving and transmitting light from said light source to said transparent end edges of said cases to illuminate said labels.

9. A display system as claimed in claim 8 further comprising a translucent panel mounted in said cabinet between said viewing compartment and said light source and being positioned within said cabinet so as to uniformly distribute light from said light source to said transparent sides and said end edges to illuminate said labels.

10. A display system as claimed in claim 9 further comprising a reflective surface mounted in the back of the cabinet behind said translucent panel for reflecting light radiating from said light source onto said translucent panel to enhance the distribution of light into said viewing compartment.

11. A display system as claimed in claim 8 wherein said viewing compartment has a height which is greater than the height of said rectangular cases arranged in said viewing compartment, the height of said viewing compartment being greater than that of said rectangular cases by a distance which approximates the width of an individual's finger, the height of the viewing compartment thereby permitting an individual to grasp one of said rectangular cases with his fingers to remove said case from said compartment.

12. A display system as claimed in claim 8 wherein said viewing compartment includes a horizontal shelf upon which said rectangular cases are arranged, said shelf having a depth which is less than the length of said rectangular cases so that said cases arranged on said shelf project slightly beyond the edge of said shelf, the projection of such thereby making it easier for an individual to grasp one of said rectangular cases for purposes of removing the case from said shelf.

13. A display system as claimed in claim 12 further comprising a backstop affixed to the back edge of said shelf for preventing said rectangular cases from sliding off the back of said shelf.

14. A display system as claimed in claim 8 comprising a plurality of said viewing compartments wherein each of said viewing compartments includes a horizontal shelf on which said rectangular cases are arranged, said shelves of said viewing compartments being vertically spaced from each other, the vertical spacing being predetermined to be greater than the height of said rectangularly shaped cases arranged on said shelves, the vertical spacing being greater than the height of said rectangularly shaped cases by a distance which approximates the width of an individual's finger, the vertical spacing thereby being sufficient to permit an individual to grasp one of said rectangularly shaped cases arranged on one of said shelves for purposes of removing said case from said shelf.

15. A display system as claimed in claim 14 wherein said shelves are transparent.

16. A display system as claimed in claim 14 wherein the back edge of at least one of said shelves is provided with an downwardly extending light blocking portion for reducing the transmission of light from said light source through a gap defined by and existing between the bottom of said shelf and the top of a rectangular case lying on a shelf located beneath said shelf.

17. A method for displaying objects as claimed in claim 14 further comprising:
providing a translucent panel mounted in the cabinet between the viewing compartment and the light source for uniformly distributing light from the light source into the viewing compartment.

18. A display system as claimed in claim 9 wherein the bottom edge of said translucent panel is beveled to collect light from said light source.

19. A display system as claimed in claim 13 wherein said backstops are transparent.

20. A method of displaying objects comprising the steps of:
providing a cabinet having at least one viewing compartment and a light source mounted in the back of the cabinet;
providing a plurality of opaque objects each of which has a generally transparent outer covering, the outer coverings being sized and configured to make substantial surface contact with each other when they are arranged in the viewing compartment in an abutting side by side manner;
arranging the plurality of opaque objects in the viewing compartment in the abutting side by side manner whereby substantial portions of the outer coverings of the opaque objects are in surface contact with each other;
positioning the plurality of abutting opaque objects in the viewing compartment so that the outer coverings of the objects are capable of receiving and transmitting light from the light source to illuminate the objects; and
turning the light source on to illuminate the objects.

* * * * *